United States Patent
Wu et al.

(10) Patent No.: US 8,413,753 B2
(45) Date of Patent: Apr. 9, 2013

(54) FOLDABLE SEAT MOUNTING RACK AND FOLDABLE MOTORIZED VEHICLE HAVING SAME

(75) Inventors: Chichun Wu, Dongguan (CN); Zhao Zhang, Dongguan (CN)

(73) Assignee: Chichun Wu, Dongguan, Guangdong Province (CN)

( * ) Notice: Subject to any disclaimer, the term of this patent is extended or adjusted under 35 U.S.C. 154(b) by 0 days.

(21) Appl. No.: 13/357,102

(22) Filed: Jan. 24, 2012

(65) Prior Publication Data

US 2012/0193159 A1 Aug. 2, 2012

(30) Foreign Application Priority Data

Jan. 28, 2011 (CN) .......................... 2011 2 0029857

(51) Int. Cl.
*B62K 15/00* (2006.01)
(52) U.S. Cl. .................. 180/208; 280/278; 280/287
(58) Field of Classification Search .................. 180/208; 280/278, 287, 87.05; 297/313, 331, 334–336; 296/181.7
See application file for complete search history.

(56) References Cited

U.S. PATENT DOCUMENTS

| | | | |
|---|---|---|---|
| 2,771,145 A * | 11/1956 | Peters | 180/208 |
| 3,354,976 A * | 11/1967 | Camps | 180/208 |
| 3,572,757 A * | 3/1971 | Camps | 80/208 |
| 4,026,573 A * | 5/1977 | Richardson | 280/278 |
| 5,312,126 A * | 5/1994 | Shortt et al. | 280/287 |
| 7,124,849 B2 * | 10/2006 | Huang | 180/208 |
| 7,451,848 B2 * | 11/2008 | Flowers et al. | 180/208 |
| 7,654,356 B2 * | 2/2010 | Wu | 180/208 |
| 7,703,567 B2 * | 4/2010 | Wang | 180/208 |
| 7,926,606 B2 * | 4/2011 | Wang | 180/208 |
| 2003/0178877 A1* | 9/2003 | Schmale | 297/313 |
| 2005/0077097 A1* | 4/2005 | Kosco et al. | 180/208 |
| 2006/0131091 A1* | 6/2006 | Lin | 180/208 |
| 2009/0206643 A1* | 8/2009 | Yamamoto | 297/313 |
| 2009/0308676 A1* | 12/2009 | Wang | 180/208 |
| 2011/0247889 A1* | 10/2011 | Kosco et al. | 180/208 |
| 2012/0193160 A1* | 8/2012 | Wu et al. | 180/208 |

* cited by examiner

*Primary Examiner* — Drew Brown
(74) *Attorney, Agent, or Firm* — Morris Manning & Martin LLP; Tim Tingkang Xia, Esq.

(57) ABSTRACT

A foldable seat mounting rack of a foldable motorized vehicle includes a pair of symmetric foldable seat mounting support. Each symmetric foldable seat mounting supports comprises: an upper mounting base, a lower mounting base, a pinion, a locking lever, a main connecting plate, a first and a second auxiliary connecting plates. The main connecting plate is pivoted on both upper and lower mounting bases. The pinion is pivoted at a middle portion on an inner side of the main connecting plate. Side surfaces at one end of the both auxiliary connecting plates are formed with racks engaging with the pinion. The first auxiliary connecting plate is pivoted on the lower mounting base and the second auxiliary connecting plate is pivoted on the upper mounting base. One end of the locking lever is pivoted on the upper end of the main connecting plate, and the other end presses against the pinion.

16 Claims, 6 Drawing Sheets

FOLDABLE SEAT MOUNTING RACK AND FOLDABLE MOTORIZED VEHICLE HAVING SAME

CROSS-REFERENCE TO RELATED APPLICATION

This application claims priority to and benefit of, pursuant to 35 U.S.C. §119(a), Chinese Patent Application No. 201120029857.8, filed Jan. 28, 2011, which is incorporated herein by reference in its entirety.

FIELD OF THE INVENTION

The present invention relates to a seat mounting structure, and more particularly to a foldable mounting rack for mounting a seat on a base of a foldable motorized vehicle.

BACKGROUND OF THE INVENTION

With the improvement of living standards, the life philosophy of being distinctive, fashionable, healthy, and environmentally friendly becomes popular, and fashionable and environmentally friendly articles for daily use and vehicles are favored by more and more people. Motorized vehicles evolve from being only a means of transport to being a symbol of a fashionable and healthy lifestyle, and are a means for practicing environmental protection. A foldable motorized vehicle saves storage room and is convenient to carry, and is small in size and light in weight after being folded, which makes it convenient to carry it up and down stairs, into and out of an elevator, and into a bus or metro train. Furthermore, the foldable motorized vehicle has a good appearance, and shows exquisite workmanship, thereby making it top equipment of fashion people.

However, in a conventional foldable motorized vehicle, a rack for mounting a seat often has parts such as a saddle and a big chain wheel, and has a complex structure, so that the saddle and the big chain wheel make it difficult to reduce the volume and weight after folding. Furthermore, the vehicle frame has a complex structure makes both folding and unfolding complicated, difficult and slow. After being folded, the foldable vehicle is not compact enough, still large in volume, and heavy in weight, and is inconvenience for carrying. Therefore, a novel foldable vehicle that is convenient to fold and unfold, of a more compact structure after being folded, small in size, light in weight, and convenient to carry becomes a new direction of research.

Therefore, it is desirable to design a foldable seat mounting rack with a novel frame and with a simple structure, and is convenient to fold and unfold.

SUMMARY OF THE PRESENT INVENTION

In one aspect, the present invention relates to a foldable seat mounting rack for mounting a seat on a foldable motorized vehicle. In one embodiment, the foldable seat mounting rack has a pair of symmetric foldable seat mounting supports. Each of the pair of symmetric foldable seat mounting supports includes: (a) an upper mounting base for mounting a seat, (b) a lower mounting base for mounting the foldable seat mounting support on the base of the foldable motorized vehicle, (c) a pinion, (d) a locking lever for locking the foldable seat mounting support into either folded or unfolded positions, (e) a main connecting plate having a slot, (f) a first auxiliary connecting plate, and (g) a second auxiliary connecting plate. The upper end of the main connecting plate is pivoted on the upper mounting base, the lower end of the main connecting plate is pivoted on the lower mounting base. The pinion is pivoted at a middle portion on an inner side of the main connecting plate, and the side surfaces at one end of the first auxiliary connecting plate and the second auxiliary connecting plate are formed with racks engaging with the pinion. The first auxiliary connecting plate is pivoted on the lower mounting base and the second auxiliary connecting plate is pivoted on the upper mounting base, respectively. One end of the locking lever is pivoted on the upper end of the main connecting plate, and the other end of the locking lever presses against the pinion.

In one embodiment, the first auxiliary connecting plate has a bent portion, a sliding portion, and a rack. The second auxiliary connecting plate also has a bent portion, a sliding portion, and a rack. The first auxiliary connecting plate and the second auxiliary connecting plate are parallel with their racks engaging with the pinion.

In one embodiment, one end surface of the pinion is formed with a recess which corresponds to an end portion of the locking lever. The locking lever has a plurality of protrusions and a mounting block. The main connecting plate is opened with a plurality of mounting holes. The plurality of the protrusions is fitted in the plurality of the mounting holes and protrudes out of the plurality of the mounting holes, respectively.

In one embodiment, the foldable seat mounting rack further includes a sliding block. The sliding block is opened with mounting holes corresponding to the protrusions on the locking lever. The sliding block is disposed on an outer side of the main connecting plate, and the protrusions on the locking lever are fitted in the mounting holes, respectively.

In one embodiment, the foldable seat mounting rack also includes a holding member. The holding member has two symmetric bending portions. A holding area is formed between the two bending portions. The holding member is connected to an outer side of the pinion. The first auxiliary connecting plate and the second auxiliary connecting plate are both fitted in the holding area.

In one embodiment, the lower mounting base is fixedly positioned on the base of a foldable motorized vehicle frame and a seat is mounted on the upper mounting base.

In another aspect, the present invention relates to a foldable motorized vehicle comprising the foldable seat mounting rack as disclosed above.

In yet another aspect, the present invention relates to a seat structure for a foldable motorized vehicle. In one embodiment, the seat structure has: (a) a foldable motorized vehicle frame, (b) a foldable seat mounting rack positioned on the foldable motorized vehicle frame, and (c) a seat mounted on the foldable seat mounting rack.

In one embodiment, the foldable seat mounting rack comprises In one embodiment, the foldable seat mounting rack has a pair of symmetric foldable seat mounting supports. Each of the pair of symmetric foldable seat mounting supports includes: (a) an upper mounting base for mounting a seat, (b) a lower mounting base for mounting the foldable seat mounting support on the base of the foldable motorized vehicle, (c) a pinion, (d) a locking lever for locking the foldable seat mounting support into either folded or unfolded positions, (e) a main connecting plate having a slot, (f) a first auxiliary connecting plate, and (g) a second auxiliary connecting plate. The upper end of the main connecting plate is pivoted on the upper mounting base, the lower end of the main connecting plate is pivoted on the lower mounting base. The pinion is pivoted at a middle portion on an inner side of the main connecting plate, and the side surfaces at one end of the first auxiliary connecting plate and the second auxiliary connecting plate are formed with racks engaging with the pinion. The first auxiliary connecting plate is pivoted on the lower mounting base and the second auxiliary connecting plate is pivoted on the upper mounting base, respectively. One end of the locking lever is pivoted on the upper end of the main connecting plate, and the other end of the locking lever presses against the pinion.

In one embodiment, the first auxiliary connecting plate has a bent portion, a sliding portion, and a rack. The second auxiliary connecting plate also has a bent portion, a sliding portion, and a rack. The first auxiliary connecting plate and the second auxiliary connecting plate are parallel with their racks engaging with the pinion.

In one embodiment, one end surface of the pinion is formed with a recess which corresponds to an end portion of the locking lever. The locking lever has a plurality of protrusions and a mounting block. The main connecting plate is opened with a plurality of mounting holes. The plurality of the protrusions is fitted in the plurality of the mounting holes and protrudes out of the plurality of the mounting holes, respectively.

In one embodiment, the foldable seat mounting rack further includes a sliding block. The sliding block is opened with mounting holes corresponding to the protrusions on the locking lever. The sliding block is disposed on an outer side of the main connecting plate, and the protrusions on the locking lever are fitted in the mounting holes, respectively.

In one embodiment, the foldable seat mounting rack also includes a holding member. The holding member has two symmetric bending portions. A holding area is formed between the two bending portions. The holding member is connected to an outer side of the pinion. The first auxiliary connecting plate and the second auxiliary connecting plate are both fitted in the holding area.

In one embodiment, the lower mounting base is fixedly positioned on the base of a foldable motorized vehicle frame and a seat is mounted on the upper mounting base.

In a further aspect, the present invention relates to a foldable motorized vehicle comprising the seat structure as disclosed above These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
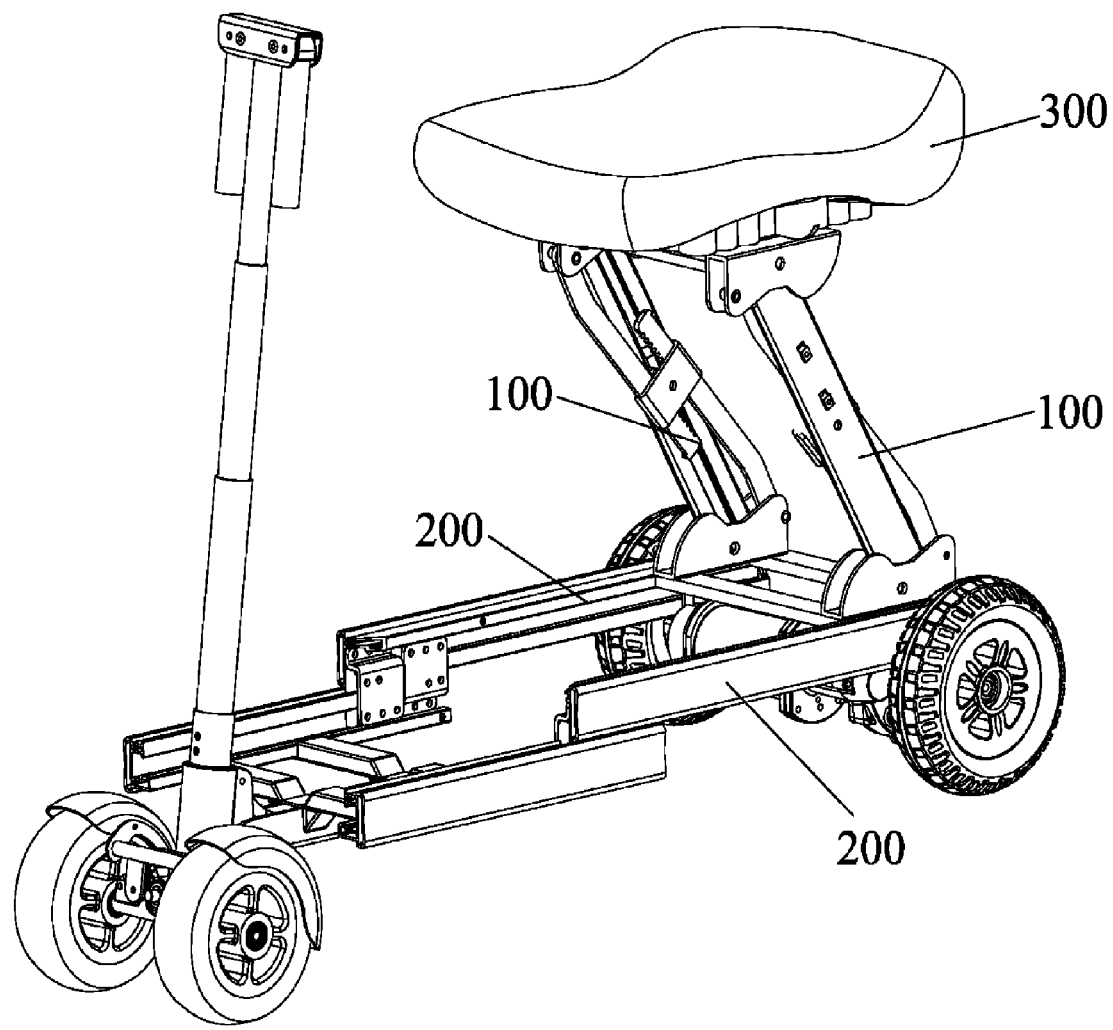
FIG. 1 is a perspective structural view of a foldable seat mounting rack positioned on a foldable motorized vehicle according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

Figure 2:
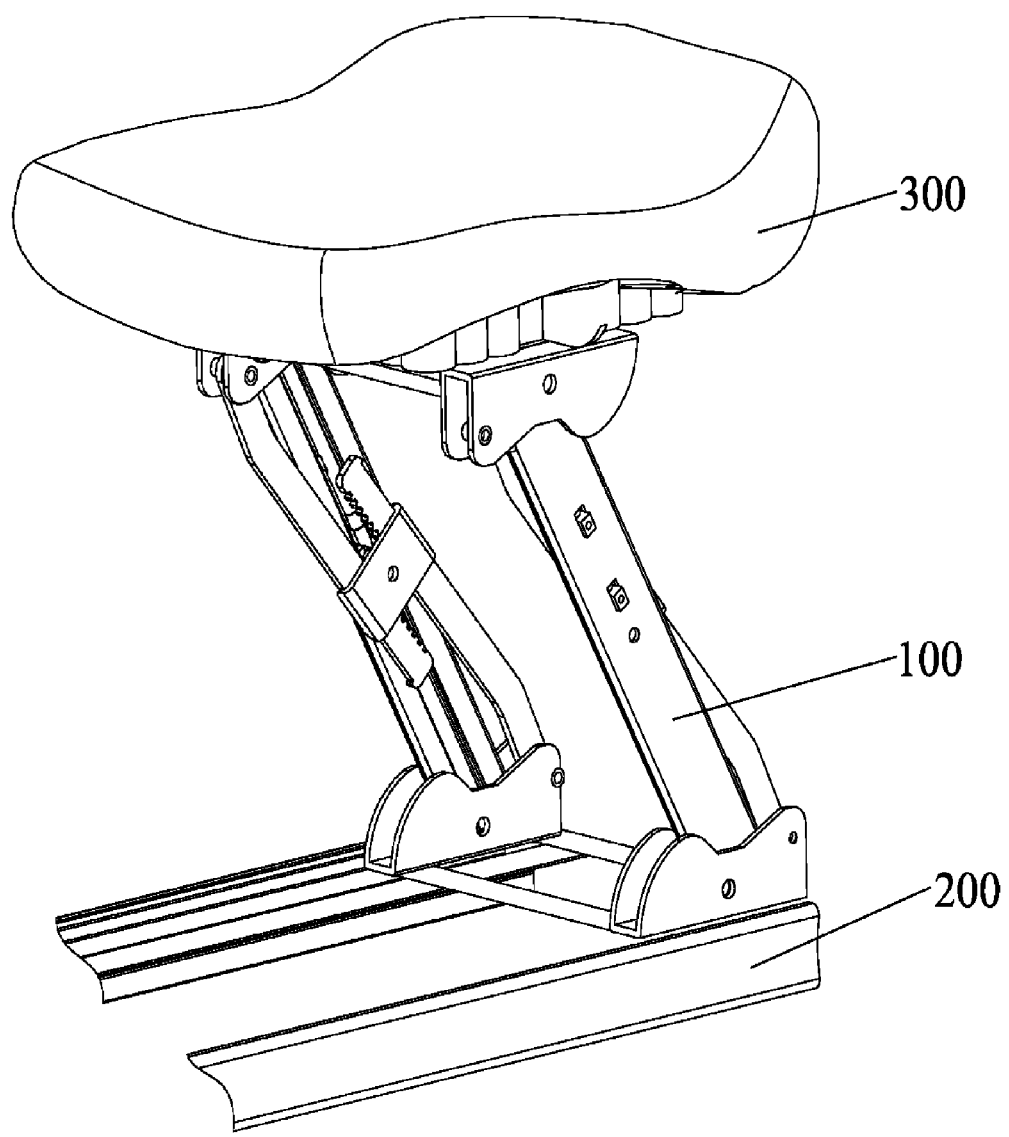
FIG. 2 is a perspective structural view of a foldable seat mounting rack with a seat installed according to one embodiment of the present invention.
Figure 3:
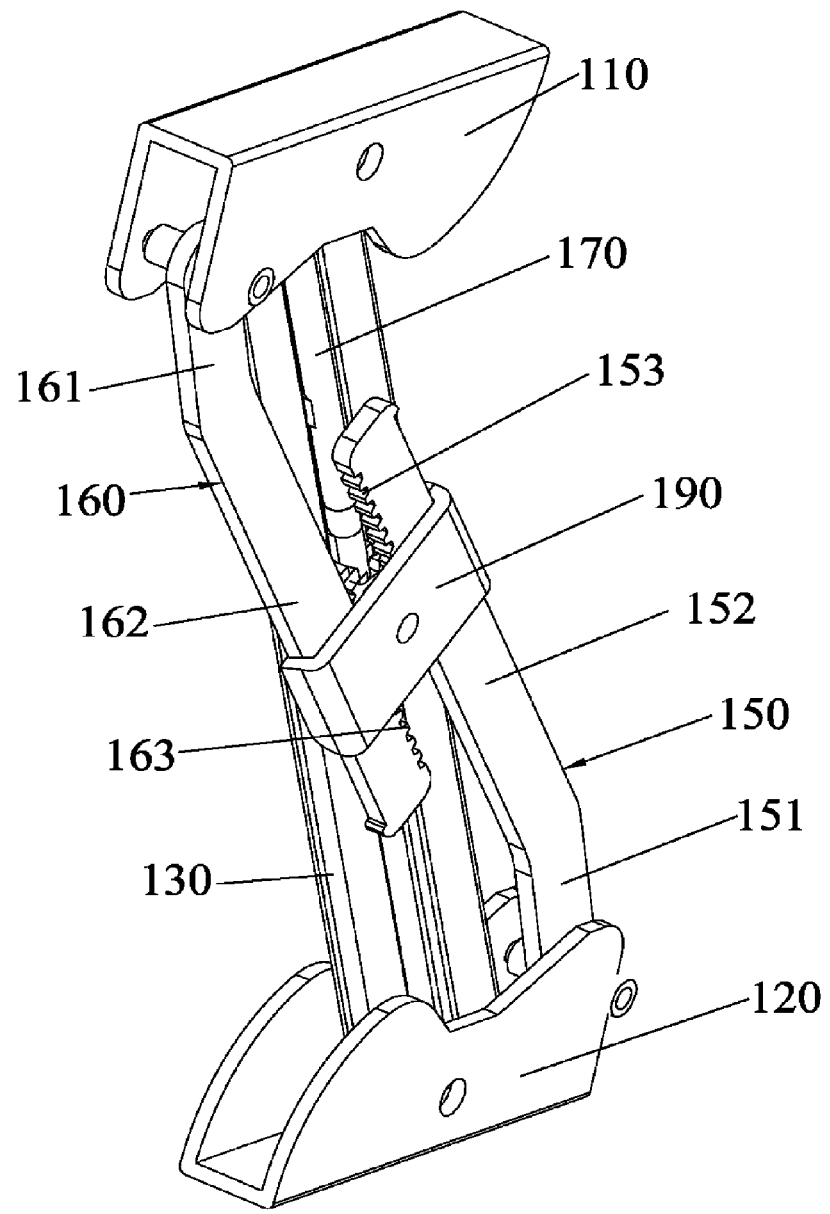
FIG. 3 is a perspective structural view of a foldable seat mounting rack according to one embodiment of the present invention.
Figure 4:
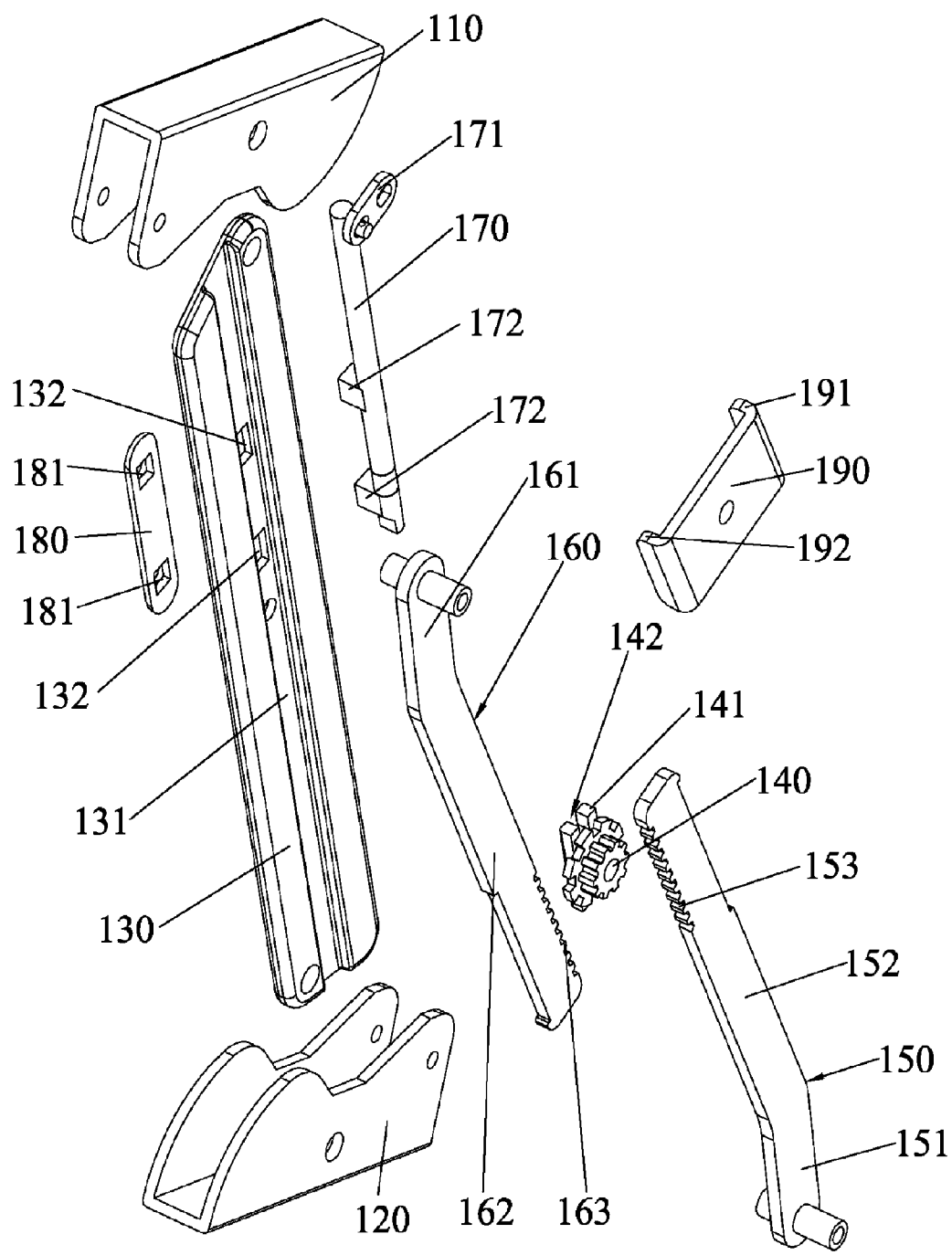
FIG. 4 is a perspective exploded view of a foldable seat mounting rack according to one embodiment of the present invention.

Referring now to FIG. 1, a foldable seat mounting rack 100 for mounting a seat 300 on the base 200 of a foldable motorized vehicle is shown according to one embodiment of the present invention. As shown in FIGS. 2 to 4, the foldable seat mounting rack 100 includes (a) an upper mounting base 110 for mounting a seat, (b) a lower mounting base 120 for mounting the foldable seat mounting support on the base 200 of the foldable motorized vehicle, (c) a pinion 140, (d) a locking lever 170 for locking the foldable seat mounting support into either folded or unfolded positions, (e) a main connecting plate 130 having a slot 131, (f) a first auxiliary connecting plate 150, and (g) a second auxiliary connecting plate 160.

In one embodiment, the upper end of the main connecting plate 130 is pivoted on the upper mounting base 110, and the lower end of the main connecting plate 130 is pivoted on the lower mounting base 120. A seat 300 is mounted at an upper end portion of the upper mounting base 110. The pinion 140 is pivoted at a middle portion on an inner side of the main connecting plate 130. The side surfaces at one end of the first auxiliary connecting plate 150 and the second auxiliary connecting plate 160 are formed with racks engaging with the pinion 140. The first auxiliary connecting plate 150 is pivoted on the lower mounting base 120 and the second auxiliary connecting plate 160 is pivoted on the upper mounting base 110, respectively. One end of the locking lever 170 is pivoted on the upper end of the main connecting plate 130, and the other end of the locking lever 170 presses against the pinion 140.

In one embodiment, first auxiliary connecting plate 150 has a bent portion 151, a sliding portion 152, and a rack 153. The second auxiliary connecting plate 160 has a bent portion 161, a sliding portion 162, and a rack 163. The first auxiliary connecting plate 150 and the second auxiliary connecting plate 160 are positioned in parallel with their racks 153 and 163 engaging with the pinion 140.

In one embodiment, one end surface of the pinion 140 is formed with a pinion stand 141 and a recess 142 on the pinion stand 141 corresponding to an end portion of the locking lever 170. The locking lever 170 has a plurality of protrusions 172 and a mounting block 171. The main connecting plate 130 is opened with a plurality of mounting holes 132 and the plurality of the protrusions 172 are fitted in the plurality of the mounting holes 132 and protrude out of the plurality of the mounting holes 132, respectively.

In one embodiment, the foldable seat mounting rack further has a sliding block180. The sliding block 180 is opened with a plurality of mounting holes 181 corresponding to the plurality of protrusions 172 on the locking lever 170. The sliding block 180 is disposed on an outer side of the main connecting plate 130, and the plurality of protrusions 172 on the locking lever 170 are fitted in the plurality of mounting holes 181, respectively.

The foldable seat mounting rack also includes a holding member 190. The holding member 190 has two symmetric bending portions 191 and 192. A holding area is formed between the two bending portions 191 and 192. The holding member 190 is connected to an outer side of the pinion 140. The first auxiliary connecting plate 150 and the second auxiliary connecting plate 160 are both fitted in the holding area.

The lower mounting base 120 is fixedly mounted on a base 200 of a foldable motorized vehicle frame, and a seat 300 is mounted on the upper mounting base 110.

Specifically, the main connecting plate 130 is in the shape of a plate, an inner side surface of the main connecting plate 130 is opened with a slot 131 along an axial direction thereof. A plurality of mounting holes 132 are opened in the slot 131. The pinion 140 is pivoted in the slot 131 through a pinion stand 141 and is located at a middle portion of the main connecting plate 130. The pinion 140 is located below the mounting holes 132 in the slot 131. A recess 142 is formed on the pinion stand 141, and is used to lock the pinion 140. The first auxiliary connecting plates 150 and the second auxiliary connecting plates 160 are both in the shape of a plate. The first auxiliary connecting plate 150 has a mounting portion 151, which is bent inwards to form a sliding portion 152. A side surface of the sliding portion 152 is formed with a rack 153 engaging with one side of the pinion 140 is formed with a rack 153 engaging with the one side of the pinion 140. The mounting portion 151 of the first auxiliary connecting plate 150 is pivoted on the lower mounting base 120, and the rack 153 on the sliding portion 152 of the auxiliary connecting plate 150 engages with one side of the pinion 140. Correspondingly, the second auxiliary connecting plate 160 also has a mounting portion 161, the mounting portion 161 is bent inwards to form a sliding portion 162, a side surface of the sliding portion 162 is formed with a rack 163 engaging with the pinion 140. The mounting portion 161 of the second auxiliary connecting plate 160 is pivoted on the upper mounting base 110. The rack 163 of the sliding portion 162 of the auxiliary connecting plate 160 engages with the other side of the pinion 140. The rack 153 of the first auxiliary connecting plate 150 and the rack 163 of the second auxiliary connecting plate 160 are arranged in parallel and opposite to each other. A slide rail is formed between the rack 153 of the first auxiliary connecting plate 150 and the rack 163 of the second auxiliary connecting plate 160. The pinion 140 is rotatable, so that the first auxiliary connecting plates 150 and the second auxiliary connecting plate 160 slide relative to each other, thereby achieving folding and unfolding of the foldable seat mounting rack 100.

In one embodiment, the locking lever 170 is disposed in the slot 131 of the main connecting plate 130. The upper end of the locking lever 170 is pivoted on the upper end of the main connecting plate 130 through a mounting block 171. The lower end of the locking lever 170 is shaped to match the recess 142 on the pinion stand 141. The locking lever 170 has a plurality of protrusions 172, where the plurality of the protrusions 172 passes through a plurality mounting holes 132 on the main connecting plate 130, and is fitted in the plurality of the mounting holes 132. A sliding block 180 is opened with a plurality of mounting holes 181 corresponding to the plurality of the protrusions 172 on the locking lever 170. The sliding block 180 is disposed on an outer side of the main connecting plate 130. The plurality of the protrusions 172 on the locking lever 170 are fitted in the mounting holes 181, so that sliding the sliding block 180 upwards can enable the sliding block 180 to drive the locking lever 170 to withdraw from the recess 142 on the pinion stand 141, so as to release locking of the foldable seat mounting rack 100 by the locking lever 170, thereby making operation more convenient. An outer side of the pinion 140 is further mounted with a holding member 190, and the holding member 190 has two bending portions 191 and 192 corresponding to each other. A holding area is formed between the two bending portions 191 and 192. The two auxiliary connecting plates 150 and 160 are both fitted in the holding area. The holding member 190 is used to limit the two auxiliary connecting plates 150 and 160, and can further protect the pinion 140.

Figure 5:
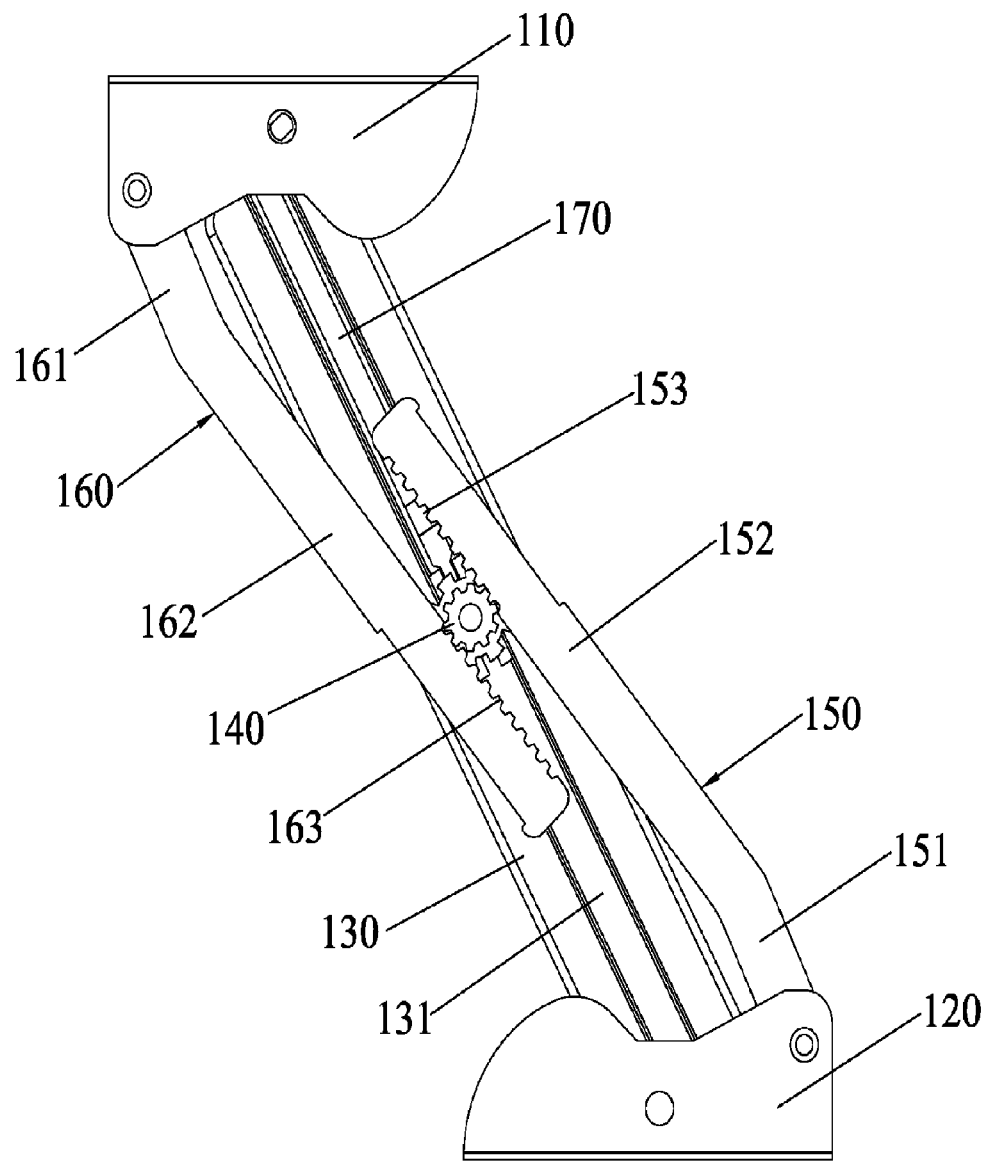
FIG. 5 is a side view of a mounting rack in a unfolded position according to one embodiment of the present invention.
Figure 6:
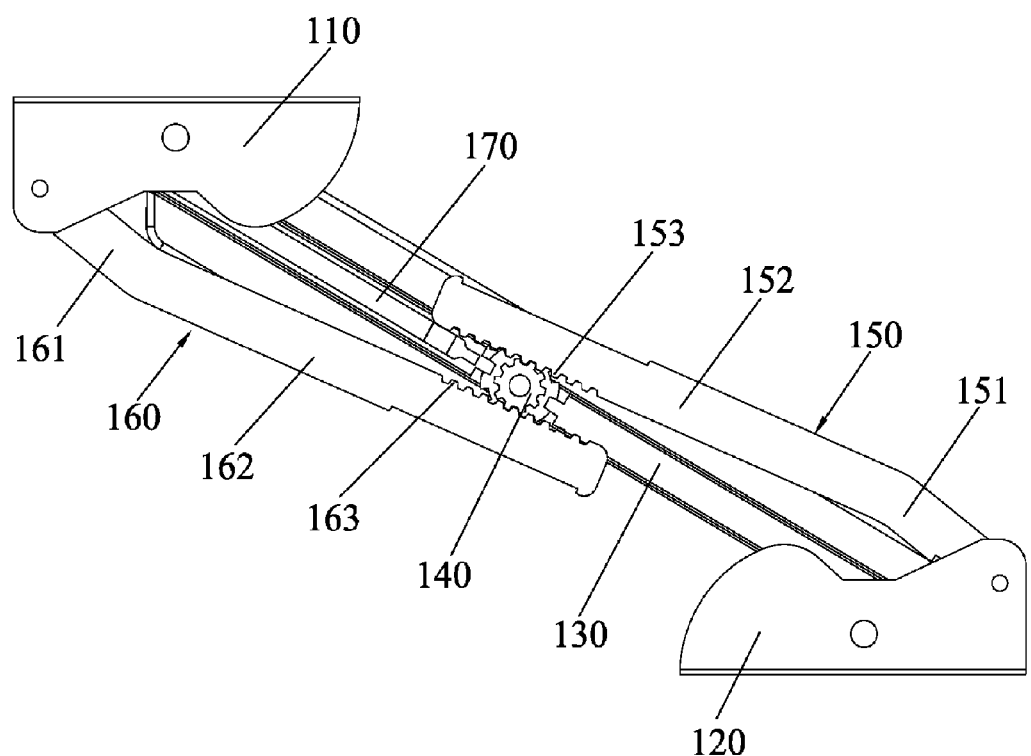
FIG. 6 is a side view of a mounting rack in a folded position according to one embodiment of the present invention.

The working principle of the foldable seat mounting rack 100 according to the present invention is illustrated below with reference to FIG. 5 and FIG. 6. In use, the foldable seat mounting rack 100 is in a locked state, the lower end of the locking lever 170 presses in the recess 142 on the pinion stand 141, and the pinion 140 is not rotatable, so that the first auxiliary connecting plate 150 and the second auxiliary connecting plate 160 cannot rotate relative to each other, thereby achieving high firmness and safety in use.

During unfolding of the foldable seat mounting rack 100, the main connecting plate 130 is pulled to rotate upwards, and during the rotation of the main connecting plate 130, the pinion 140 rotates, and the first auxiliary connecting plate 150 and the second auxiliary connecting plate 160 move towards each other in opposite directions, so that the foldable seat mounting rack 100 moves upwards gradually, and is unfolded eventually. Then, the locking lever 170 is enabled to slide so that the lower end portion of the locking lever 170 presses in the recess 142 on the pinion stand 141 to lock the pinion 140, thereby achieving locking of the foldable seat mounting rack 100, as shown in FIG. 5.

During the folding process, the sliding block 180 is pressed and enabled to slide upwards to drive the locking lever 170 to move upwards, so that the lower end of the locking lever 170 is withdrawn from the recess 142 on the pinion stand 141 to release locking of the pinion 140. The seat is pushed downwards to make the main connecting plate 130 rotate downwards, and during the rotation of the main connecting plate 130, the pinion 140 rotates, and the first auxiliary connecting plate 150 and the second auxiliary connecting plate 160 slide away from each other in opposite directions, so that the foldable seat mounting rack 100 moves downwards gradually, and is folded eventually, as shown in FIG. 6.

In another aspect, the present invention relates to a seat structure for a foldable motorized vehicle. In one embodiment, the seat structure includes: (a) a foldable motorized vehicle frame 200, (b) a foldable seat mounting rack 100 positioned on the foldable motorized vehicle frame 200, and (c) a seat 300 mounted on the foldable seat mounting rack 100.

In one embodiment, the foldable seat mounting rack 100 has a pair of symmetric foldable seat mounting support. Each of the pair of symmetric foldable seat mounting support includes: (a) an upper mounting base 110 for mounting a seat, (b) a lower mounting base 120 for mounting the foldable seat mounting support on the base 200 of the foldable motorized vehicle, (c) a pinion 140, (d) a locking lever 170 for locking the foldable seat mounting support into either folded or unfolded positions, (e) a main connecting plate 130 having a slot 131, (f) a first auxiliary connecting plate 150, and (g) a second auxiliary connecting plate 160.

In one embodiment, the upper end of the main connecting plate 130 is pivoted on the upper mounting base 110, and the lower end of the main connecting plate 130 is pivoted on the lower mounting base 120. A seat 300 is mounted at an upper end portion of the upper mounting base 110. The pinion 140 is pivoted at a middle portion on an inner side of the main connecting plate 130. The side surfaces at one end of the first auxiliary connecting plate 150 and the second auxiliary connecting plate 160 are formed with racks engaging with the pinion 140. The first auxiliary connecting plate 150 is pivoted on the lower mounting base 120 and the second auxiliary connecting plate 160 is pivoted on the upper mounting base 110, respectively. One end of the locking lever 170 is pivoted on the upper end of the main connecting plate 130, and the other end of the locking lever 170 presses against the pinion 140.

In one embodiment, first auxiliary connecting plate 150 has a bent portion 151, a sliding portion 152, and a rack 153. The second auxiliary connecting plate 160 has a bent portion 161, a sliding portion 162, and a rack 163. The first auxiliary connecting plate 150 and the second auxiliary connecting plate 160 are positioned in parallel with their racks 153 and 163 engaging with the pinion 140.

In one embodiment, one end surface of the pinion 140 is formed with a pinion stand 141 and a recess 142 on the pinion stand 141 corresponding to an end portion of the locking lever 170. The locking lever 170 has a plurality of protrusions 172 and a mounting block 171. The main connecting plate 130 is opened with a plurality of mounting holes 132 and the plurality of protrusions 172 are fitted in the plurality of mounting holes 132 and protrude out of the plurality of the mounting holes 132, respectively.

In one embodiment, the foldable seat mounting rack further has a sliding block180. The sliding block 180 is opened with a plurality of mounting holes 181 corresponding to the plurality of protrusions 172 on the locking lever 170. The sliding block 180 is disposed on an outer side of the main connecting plate 130, and the plurality of protrusions 172 on the locking lever 170 are fitted in the plurality of mounting holes 181, respectively.

The foldable seat mounting rack also includes a holding member 190. The holding member 190 has two symmetric bending portions 191 and 192. A holding area is formed between the two bending portions 191 and 192. The holding member 190 is connected to an outer side of the pinion 140. The first auxiliary connecting plate 150 and the second auxiliary connecting plate 160 are both fitted in the holding area.

The foldable seat mounting rack according to claim 1, wherein the lower mounting base 120 is fixedly mounted on a base 200 of a foldable motorized vehicle frame, and a seat 300 is mounted on the upper mounting base 110.

The foldable seat mounting rack 100 according to the present invention is not limited to the application to mounting a seat on a foldable motorized vehicle, and may also be applied to other similar folding mechanisms according to actual needs.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A foldable seat mounting rack for mounting a seat on a foldable motorized vehicle comprising a pair of symmetric foldable seat mounting supports, wherein each of the pair of symmetric foldable seat mounting supports comprises:
    (a) an upper mounting base for mounting a seat;
    (b) a lower mounting base for mounting the foldable seat mounting support on the base of the foldable motorized vehicle;
    (c) a pinion;
    (d) a locking lever for locking the foldable seat mounting support into either folded or unfolded positions;
    (e) a main connecting plate having a slot;
    (f) a first auxiliary connecting plate; and
    (g) a second auxiliary connecting plate,
    wherein an upper end of the main connecting plate is pivoted on the upper mounting base, a lower end of the main connecting plate is pivoted on the lower mounting base, the pinion is pivoted at a middle portion on an inner side of the main connecting plate, side surfaces at one end of the first auxiliary connecting plate and the second auxiliary connecting plate are formed with racks engaging with the pinion, the first auxiliary connecting plate is pivoted on the lower mounting base and the second auxiliary connecting plate is pivoted on the upper mounting base, respectively, one end of the locking lever is pivoted on the upper end of the main connecting plate, and the other end of the locking lever presses against the pinion.

2. The foldable seat mounting rack according to claim 1, wherein the first auxiliary connecting plate comprises a bent portion, a sliding portion, and a rack, the second auxiliary connecting plate comprises a bent portion, a sliding portion, and a rack, and the first auxiliary connecting plate and the second auxiliary connecting plate are parallel with their racks engaging with the pinion.

3. The foldable seat mounting rack according to claim 1, wherein one end surface of the pinion is formed with a recess corresponding to an end portion of the locking lever.

4. The foldable seat mounting rack according to claim 1, wherein the locking lever has a plurality of protrusions and a mounting block, the main connecting plate is opened with a plurality of mounting holes, and the plurality of the protrusions are fitted in the plurality of the mounting holes and protrude out of the plurality of the mounting holes, respectively.

5. The foldable seat mounting rack according to claim 4, wherein the foldable seat mounting rack further comprises a sliding block, the sliding block is opened with mounting holes corresponding to the protrusions on the locking lever, the sliding block is disposed on an outer side of the main connecting plate, and the protrusions on the locking lever are fitted in the mounting holes, respectively.

6. The foldable seat mounting rack according to claim 1, further comprising a holding member, wherein the holding member has two symmetric bending portions, a holding area is formed between the two bending portions, the holding member is connected to an outer side of the pinion, and the first auxiliary connecting plate and the second auxiliary connecting plate are both fitted in the holding area.

7. The foldable seat mounting rack according to claim 1, wherein the lower mounting base is fixedly connected to the base of a foldable motorized vehicle frame, and a seat is mounted on the upper mounting base.

8. A foldable motorized vehicle, comprising the foldable seat mounting rack according to claim 1.

9. A seat structure for a foldable motorized vehicle comprising:
(a) a foldable motorized vehicle frame;
(b) a foldable seat mounting rack positioned on the foldable motorized vehicle frame; and
(c) a seat mounted on the foldable seat mounting rack,
wherein the foldable seat mounting rack comprises a pair of symmetric foldable seat mounting supports, wherein each of the pair of symmetric foldable seat mounting supports comprises:
(i) an upper mounting base for mounting a seat;
(ii) a lower mounting base for mounting the foldable seat mounting support on the base of the foldable motorized vehicle;
(iii) a pinion;
(iv) a locking lever for locking the foldable seat mounting support into either folded or unfolded positions;
(v) a main connecting plate having a slot;
(vi) a first auxiliary connecting plate; and
(vii) a second auxiliary connecting plate,
wherein an upper end of the main connecting plate is pivoted on the upper mounting base, a lower end of the main connecting plate is pivoted on the lower mounting base, the pinion is pivoted at a middle portion on an inner side of the main connecting plate, side surfaces at one end of the first auxiliary connecting plate and the second auxiliary connecting plate are formed with racks engaging with the pinion, the first auxiliary connecting plate is pivoted on the lower mounting base and the second auxiliary connecting plate is pivoted on the upper mounting base, respectively, one end of the locking lever is pivoted on the upper end of the main connecting plate, and the other end of the locking lever presses against the pinion.

10. The seat structure according to claim 9, wherein the first auxiliary connecting plate comprises a bent portion, a sliding portion, and a rack, the second auxiliary connecting plate comprises a bent portion, a sliding portion, and a rack, and the first auxiliary connecting plate and the second auxiliary connecting plate are parallel with their racks engaging with the pinion.

11. The seat structure according to claim 9, wherein one end surface of the pinion is formed with a recess corresponding to an end portion of the locking lever.

12. The seat structure according to claim 9, wherein the locking lever has a plurality of protrusions and a mounting block, the main connecting plate is opened with a plurality of mounting holes, and the plurality of the protrusions are fitted in the plurality of the mounting holes and protrude out of the plurality of the mounting holes, respectively.

13. The seat structure according to claim 12, wherein the foldable seat mounting rack further comprises a sliding block, the sliding block is opened with mounting holes corresponding to the protrusions on the locking lever, the sliding block is disposed on an outer side of the main connecting plate, and the protrusions on the locking lever are fitted in the mounting holes, respectively.

14. The seat structure according to claim 9, further comprising a holding member, wherein the holding member has two symmetric bending portions, a holding area is formed between the two bending portions, the holding member is connected to an outer side of the pinion, and the first auxiliary connecting plate and the second auxiliary connecting plate are both fitted in the holding area.

15. The seat structure according to claim 9, wherein the lower mounting base is fixedly connected to the base of the foldable motorized vehicle frame, and a seat is mounted on the upper mounting base.

16. A foldable motorized vehicle, comprising the seat structure according to claim 9.

* * * * *